(12) United States Patent  (10) Patent No.: US 8,326,596 B2
Cohen  (45) Date of Patent: Dec. 4, 2012

(54) METHOD AND APPARATUS FOR TRANSLATING SPEECH DURING A CALL

(76) Inventor: Sanford H. Cohen, New York, NY (US)

( * ) Notice: Subject to any disclaimer, the term of this patent is extended or adjusted under 35 U.S.C. 154(b) by 638 days.

(21) Appl. No.: 12/455,140

(22) Filed: May 28, 2009

(65) Prior Publication Data

US 2010/0121629 A1   May 13, 2010

(51) Int. Cl.
 *G06F 17/28* (2006.01)
 *G10L 11/00* (2006.01)
 *G10L 21/00* (2006.01)
(52) U.S. Cl. .................................. 704/2; 704/270
(58) Field of Classification Search ............... 704/2, 270
 See application file for complete search history.

(56) References Cited

U.S. PATENT DOCUMENTS

| | | | |
|---|---|---|---|
| 5,815,196 A * | 9/1998 | Alshawi | 348/14.12 |
| 6,292,769 B1 * | 9/2001 | Flanagan et al. | 704/3 |
| 7,133,513 B1 | 11/2006 | Zhang | |
| 7,440,863 B2 * | 10/2008 | Manfredi | 702/108 |
| 7,546,235 B2 * | 6/2009 | Brockett et al. | 704/9 |
| 8,064,608 B2 * | 11/2011 | Kakara | 381/22 |
| 2002/0099542 A1 * | 7/2002 | Mitchell et al. | 704/231 |
| 2003/0115064 A1 | 6/2003 | Gusler et al. | |
| 2004/0093211 A1 | 5/2004 | Reynolds et al. | |
| 2005/0131709 A1 * | 6/2005 | Creamer et al. | 704/277 |
| 2007/0094009 A1 * | 4/2007 | Ryu et al. | 704/200.1 |

* cited by examiner

*Primary Examiner* — Eric Yen
(74) *Attorney, Agent, or Firm* — Charles A. Rattner

(57) ABSTRACT

A translation platform allows a client using a first language to communicate via translated voice and/or text to at least a second client using a second language. A control server uses various speech recognition engines, text translation engines and text to speech engines to accomplish real-time or near-real time translations.

10 Claims, 4 Drawing Sheets

METHOD AND APPARATUS FOR TRANSLATING SPEECH DURING A CALL

CROSS-REFERENCE TO RELATED APPLICATIONS

This application claims priority under 35 U.S.C. §§120 and 371 to PCT Patent Application Ser. No. PCT/US2007/024492 entitled METHOD AND APPARATUS FOR TRANSLATING SPEECH DURING A CALL filed in the name of Sanford H. Cohen on Nov. 28, 2007, which in turn claims priority from U.S. Provisional Patent Application Ser. No. 60/861,325 entitled METHOD AND APPARATUS FOR TRANSLATING SPEECH DURING A CALL filed in the name of Sanford H. Cohen on Nov. 28, 2006, the entirety of both of which are hereby incorporated by reference.

BACKGROUND OF THE DISCLOSURE

With the continuing growth of international commerce and travel, there has been a corresponding increase in the demand for translation services, for example, to accommodate business communications between parties who use different languages. This demand has led to the development of a plethora of text translation software, including, for example, the web-based text translation services provided by GOOGLE, as well as BABELFISH by ALTAVISTA.

Many speech-to-text software engines have likewise been produced. These include DRAGON NATURALLY SPEAKING, IBM'S VIA VOICE, and LERNOUT & HAUSPIE'S PROFESSIONAL EDITION. However, existing speech-to-text engines are generally single-language only. That is, speech in one language is only converted to text in the same language, and a different version of such engine may be provided for each of various different languages. In addition, speech recognition algorithms used by various software products are proprietary. Therefore, a user must train each such software program to recognize his/her voice.

In addition, there exist many text-to-speech engines in which text is converted to computer-generated speech. One example of this is NATURAL VOICES by AT&T CORP. Most such text-to-speech engines are also single-language only, where different versions may exist for different languages.

While each of these types of components can be used to readily convert various communications from speech to text, or text from one language into text of another, to date, there has been no successful commercial implementation of an end-to-end system in which speech from one language can be readily converted to speech in another, and particularly where such conversion can be accomplished and presented in real-time or near real-time.

SUMMARY OF THE DISCLOSURE

Accordingly, the present disclosure introduces an end-to-end speech translation system particularly for use in converting speech into one or more separate languages in real-time during a telephone call involving two or more parties. The call may be placed over standard Public Switched Telephone Networks (PSTNs) using standard telephone equipment, or may, in various embodiments may be a call accomplished by intercommunication between personal computers and the like using Voice-Over-Internet Protocol (VOIP), in accordance with known VOIP call systems (i.e., VONAGE). The end-to-end system, sometimes referred to herein as the SPEAKLIKE platform, may also be used in the context of any other type of communications systems, such as Instant Messaging (IM) platforms from GOOGLE, YAHOO, AOL and MSN, or VOIP systems, such as such as those from CISCO, AVAYA or other stand-alone applications.

The SPEAKLIKE platform may, in various embodiments, include a Web services infrastructure and protocol that any telecom, VOIP, or IM system can plug into for transcription and translation services. The SPEAKLIKE platform provides an open software protocol, executes various speech-to-text and text-to speech conversions, as well as translations of text from one language to others, and includes various accounting functions to bill calling and/or called parties for such translations and conversions performed during a call.

Various embodiments of the SPEAKLIKE platform introduce the following functionality: (1) a Web services architecture that allows clients to connect for the services they need, such as speech transcription, or text-to-text translation, as well as end-to-end VOIP; (2) a continuous upgrade process that plugs in improved capabilities developed by third-party proprietary speech and text conversion engines in an open source format as soon as they are available; and (3) an open system that allows any provider of technology or language services to easily plug in and expand the capabilities of the SPEAKLIKE platform. The SPEAKLIKE platform may provide a single user interface for all voice and text-based translation, transcription and communication services, and may dynamically connect multiple communication networks of varying modalities (PSTN, Internet Protocol (IP), VOIP, IM, etc).

In addition, in various embodiments, the SPEAKLIKE platform provides universal sockets to permit reconfiguring and substituting third-party speech-to-text, text translation and text-to-speech technologies as rapidly as the technologies improve, and in a way that is transparent to users. The SPEAKLIKE platform may also provide users with online storage and "available anywhere" access to personalized speech recognition profiles.

BRIEF DESCRIPTION OF THE ACCOMPANYING FIGURES

Further aspects of the present disclosure will be more readily appreciated upon review of the detailed description of its various embodiments, described below, when taken in conjunction with the accompanying drawings, of which:

DETAILED DESCRIPTION OF VARIOUS EMBODIMENTS

Figure 1:
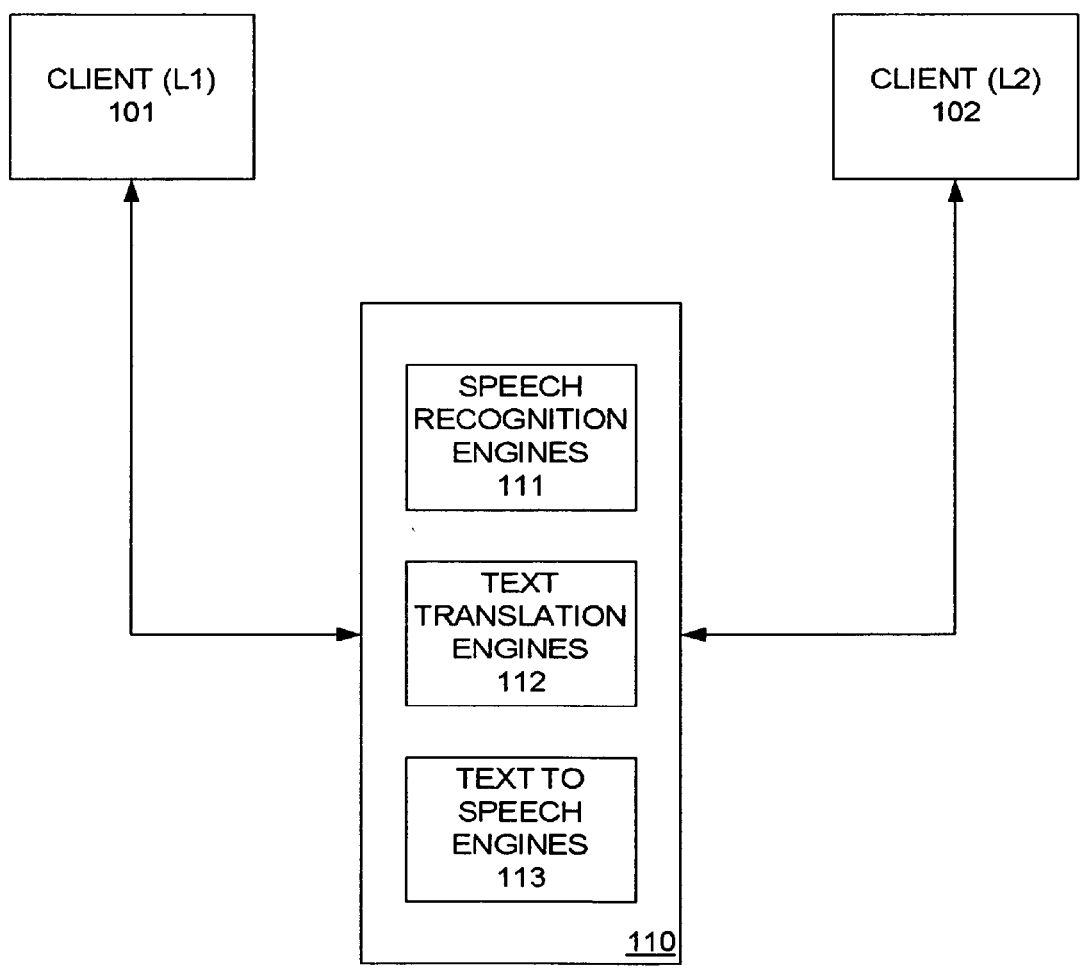
FIG. 1 is a block diagram illustrating an exemplary embodiment of a scalable end-to-end system for accomplishing speech translation between two parties in two different languages during a telephone and/or VOIP call.

As used herein, the following terms shall be understood to include the following, non-limiting definitions:

Software Engine—a modular software component for performing one or more specific tasks. Examples of such engines and basic tasks include: speech-to-text converters, text-to-speech converters, text-to-text translators, text compression, speech compression and encryption. Such engines may be open-source or proprietary (provided exclusively by a single third party).

Application Software—a program that combines engines with additional logic to solve a particular task, e.g. real-time speech translation, batch translation of online documents, and the like. Applications can be generated by SPEAKLIKE or can be various applications that perform one or more of the individual tasks as developed by third parties.

Protocol—a collection of rules allowing user applications and/or engines to communicate. Examples include Extensible Messaging and Presence Protocol (XMPP), also known as "Jabber," Transmission Control Protocol (TCP) and User Datagram Protocol (UDP).

SPEAKLIKE Platform—a collection of protocols, hardware and software configurations, and contractual arrangements that allows users to communicate via SPEAKLIKE and third party applications, based on third party engines Functional Architecture—the mathematical decomposition of the translation problem.

Platform Architecture—the design of the SPEAKLIKE platform. It must support the functional architecture, the business needs of SPEAKLIKE clients, the business requirements of the application and engine providers, and the like.

Referring now to FIGS. 1-5, therein are depicted various exemplary illustrations of the components of a hardware system, and the types of software and data interactions therebetween, which together may form one version of an end-to-end system for providing translation of speech during a call. This SPEAKLIKE platform 100 allows a calling party to call a called party, wherein voice communications (i.e. speech) are received from each such user by the platform and converted from speech to text. The text is then translated from the language of the speaking party to text in the language of the party receiving the speech. The translated text is then "spoken" to the receiving party in his/her language using text-to-speech algorithms. In various embodiments, the text may be presented to the calling party and the called party in their respective language.

In certain embodiments, the translated, computer-generated speech may be presented over the actual speech of the speaking party, and perhaps in a higher volume than the actual speech. In alternate embodiments, the computer-generated speech may be transmitted to the receiving party in place of the actual speech of the speaking party. A user may select from these options in various embodiments.

In various embodiments, the text in both languages may be presented visually to each party in their respective language, on a display device employed by the user (i.e., personal computer, personal digital assistant, cellular telephone display, and any similar devices). The user may be presented with options as to which language or language are visually-presented, with the default being the language of the respective user. Additionally, transcripts of entire conversations may be saved and transmitted to one or all parties of a call (i.e. by e-mail or other text delivery). The text transcription may be provided in any selected language. This option, however, may require the assent of all parties in order to address privacy concerns in certain jurisdictions. ◇

The speech-to-text (speech recognition), text translation, and text-to-speech (computer-generated speech) algorithms described herein may include any such known algorithms employed by existing software and services (such as any of those referenced herein), or may include equivalent techniques, as well as accommodate those developed hereinafter. In addition, the SPEAKLIKE platform may employ its own, self-developed engines and protocols for accomplishing these functions.

The SPEAKLIKE platform can be adapted to accommodate any number of spoken languages without limitation, in addition to the spoken languages identified herein.

Turning now to FIG. 1, therein is depicted one exemplary embodiment of an end-to-end communication system using the SPEAKLIKE platform 100. The hardware includes a client terminal 101 that is operated by a first party to a call employing a first language (L1), a second client terminal 102 that is operated by a second party to the call employing a second language (L2), and a control server 110 for operating the SPEAKLIKE platform 100. The control server 110 is interposed between each client terminal 101, 102, disposed at opposite ends of a call or other communication. While the call may be a simple telephone call on one or both ends of a two-party call, the descriptions hereinafter will reference an embodiment in which at least one end of the call is accomplished using VOIP.

The client terminals 101 and 102 may be any device capable of accepting speech or text input from a human, and outputting speech or text input to a human. The client may be "thin" or "thick", i.e. capable of minimal computation or heavy computation to make voice to text translations.

Various task engines 111-113 are shown which are maintained and processed by the Control Server.

Text-to-speech engines 113 may be any apparatus, systems or methods for converting text and control data to an audio signal that can be interpreted by a human as speech, and that communicates with the Control Server using a specified protocol. Control data may include auxiliary data specifying non-verbal data to be communicated (such as emotion as detected by tone analysis software employed in the SPEAKLIKE platform), voice characteristics (such as gender), or other any other data other than the spoken words themselves. The text-to-speech engine may take translated text and transmit it to the intended party with the same tonality and gender detected by tonal analysis.

Speech recognition (or speech-to-text) engines 111 may be any apparatus or process for converting human speech into text and, optionally, auxiliary data representing characteristics of the speaker's voice and/or non-verbal content of the speech (e.g. surprise, other emotional responses, indications of deception or tension, and the like). The apparatus communicates with the Control Server using a specified protocol.

Text Translation engines 112 may be any apparatus or process for converting text in one natural language directly to text in another natural language, and that communicates with the Control Server using a specified protocol. The apparatus may be provided with additional inputs in the form of auxiliary data containing non-verbal communication data, and may output additional data in the form of non-verbal communication cues.

The Control Server 110 coordinates flows of data between task engines to implement a particular application. The Control Server 110 may be any number of inter-communicating enterprise servers or the like that are co-located or regionally distributed. The servers may communicate over any type of network, including the Internet.

The Control Server 110 is also operative to perform central processing unit (CPU) and bandwidth load balancing between client terminals and the SPEAKLIKE platform 100, creating and update accounts for users of the SPEAKLIKE platform 100, indicate whether a given user is accepting communications, and on which terminals, determining an internet routing between the terminals of the users participating in a communication, monitoring packet latency and other measures of communication service, and dynamically optimizing application performance, monitoring quality of speech transcriptions and translations, and dynamically optimizing performance. These functions may be accomplished using any known telecommunications and computer data transfer techniques now known or hereinafter developed.

The Control Server 110 may accommodate two-party or multi-party calls and may be scaled to accommodate any number of world-wide users. Multiple users may participate in a communication, as in a telephone conference call conducted simultaneously in multiple languages. In addition, not all parties to the call need be SPEAKLIKE subscribers. A single user may participate in a communication, as in a transcription or translation application, at his/her expense.

The Control Server 110 is also operative to store groundtruth data for each user, specifically, a pairing between user-provided inputs to a fixed transcription or translation task, and desired output of such a task. This includes scheduling and routing the optimization of task module performance on individual users, using groundtruth data.

The Control Server 110 is also operative to store profile data about each user. Such profile data may include user personal information (name, address, telephone number, email address, date of birth, social security number, credit card information, and the like) address book(s), groundtruth voice recording (so voice training the SPEAKLIKE platform to the user need only be performed once), engine-specific training parameters, preferred language, records of past conversations, usage information for billing purposes, and, in certain embodiments, for the purposes of compensating engine authors (i.e. royalties for use).

The SPEAKLIKE platform may be implemented in a variety of ways:
  (a) Centralized
    Messages are routed through servers controlled by one organization
    No one can create their own client or server, or even operate their own server
    Examples of centralized platforms: AOL Instant Messenger, Microsoft Instant Messenger
  (b) Federated
    Messages are routed between servers
    Anyone can operate their own domain (like email)
    Example: Anything based on jabber, e.g. GoogleTalk
  (c) Peer-to-Peer
    Messages are routed between user clients without use of central servers
    Example: Skype, which uses central servers only for logins and for connecting to the PSTN Any business model will require a central server for some critical component, therefore, SPEAKLIKE is believed to be best implemented as a federated model due to quality-of-service (QoS) concerns.

A user may subscribe to the SPEAKLIKE platform and pay a monthly, annual, or per-call fee. Billing may be based on any of a wide variety of billing options as are employed by current telecommunications companies. A registered user of the system may perform the following functions with the SPEAKLIKE platform: registration/login, payment, profile creation/update, application selection and any required downloads from the Control Server to the PC client for interacting with the SPEAKLIKE platform, secure application execution, transcript searching of prior conversations, reviewing usage statistics. These may be accomplished in the manner of similar functions in existing web sites, as will be readily appreciated by one of ordinary skill in the art.

The SPEAKLIKE platform provides users with the following functions: user profile storage, auto-training upon new engine loading, session (connection) initiation, maintenance and termination, QoS monitoring (end-to-end latency, security, and the like), and usage statistics.

The SPEAKLIKE platform may use standard, open protocols to connect its components to clients/users. This will accelerate development by using existing clients and libraries, plug in to new clients and business models, and provide services, such as translation and transcription, that only require part of the pipeline. The components of the pipeline can run on separate servers. This makes the system easy to scale and upgrade. It also allows SPEAKLIKE to work with technology providers who are willing to provide their own servers.

The SPEAKLIKE platform will provide an open source harness, or "socket," which implements the protocol for each server in the pipeline. A developer from SPEAKLIKE or a technology provider can easily plug in a new engine by programming the appropriate calls into the socket code.

The SPEAKLIKE platform may provide a control server that manages the user profiles, sets up the call routes, and does the accounting.

Each client may monitor up to seven steps of the pipeline:
  Text version of recognized speech from self
  Translated text from self
  Translated audio output from self (not critical)
  Foreign audio
  Text version of foreign speech
  Translated foreign text
  Translated audio input (shown)

Figure 2:
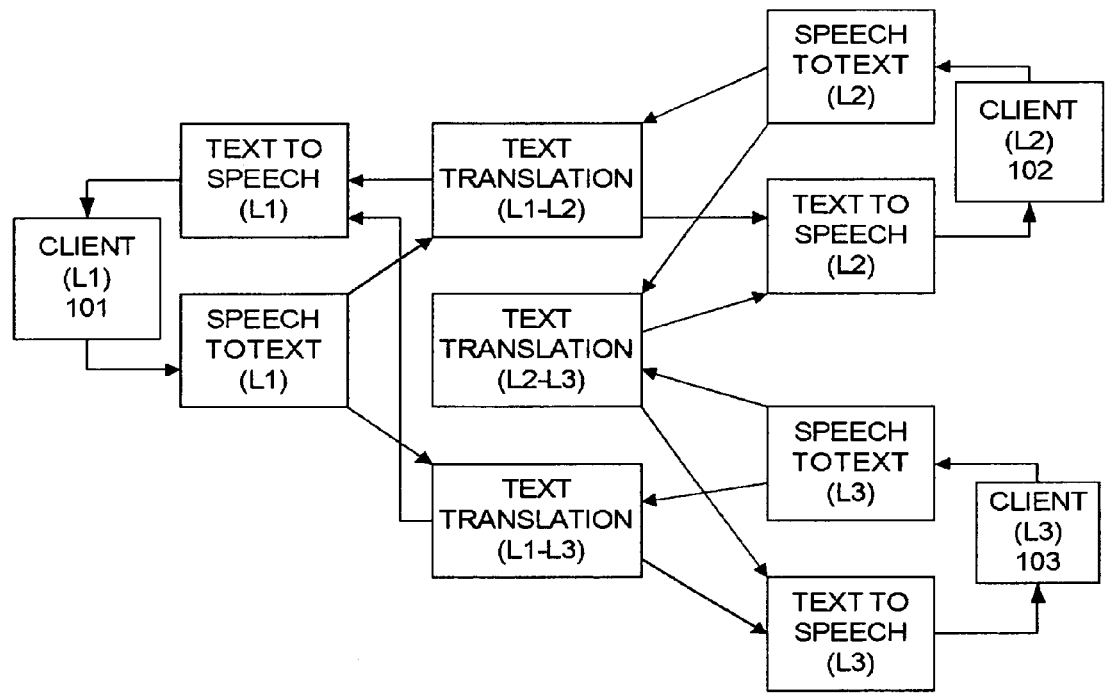
FIG. 2 is a block diagram illustrating an embodiment of a scalable system for accomplishing speech translation among multiple parties in multiple languages, in accordance with the system depicted in FIG. 1.

FIG. 2 shows how the SPEAKLIKE platform may be scaled to include any number and type of languages. A first language pair may require certain plug-in components to go end to end both ways. The second language pair may requires additional plug-in components. Scaling to additional language will generally require fewer additional components. The SPEAKLIKE platform can rapidly scale across languages by making it easy for outside providers to supply these components.

The SPEAKLIKE platform may be deployed to make standard Web services calls between servers. However, other types of messaging protocols may be accommodated, including: text messaging, session initiation and reporting, and audio streaming. Session initiation will need to be custom-built. The sessions in this system are complicated because they involve a route through up to seven different boxes. Furthermore, each step of the pipeline may be asked to report its output to an end client, so each stream is split into multiple streams.

The SPEAKLIKE platform must handle current and likely future engines and applications. The current state-of-the-art functional architecture is comprised of three independent steps, speech-to-text (same language), text-to-text (different languages) and text-to-speech (same language). This architecture is also reflected in the architecture of the business ecosystem, with different vendors specializing in different steps, and a very few (e.g. IBM) participating in the entire pipeline. However, considerable information is carried in non-textual components of speech (e.g. tone, accent, etc) as well as in non-verbal cues. Therefore, the protocols should expect that engines may produce text in language Y directly from speech in language X, or even speech in language Y directly from speech in language X. Future engines may also mix media streams, for example, combining video with translated text, or even combining translated audio with textual descriptions of emotions or other communicated information. Accommodation of all these and like scenarios is readily contemplated.

Figure 3:
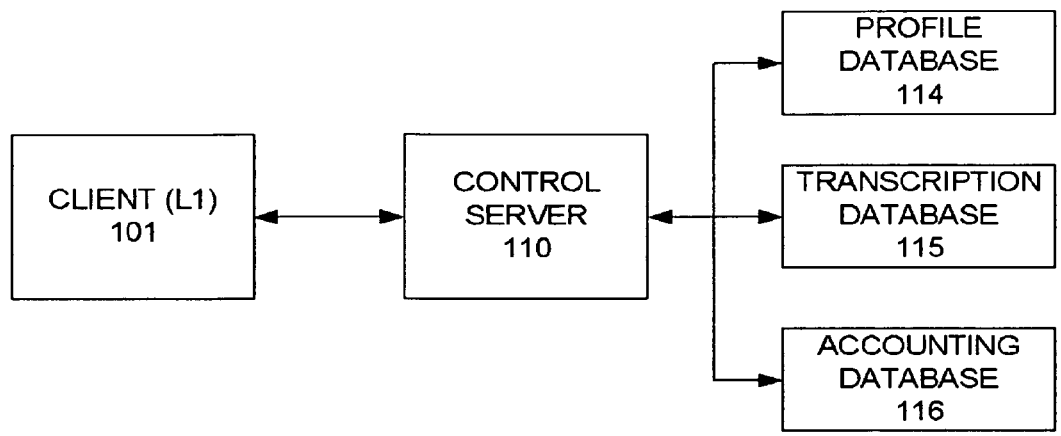
FIG. 3 is a block diagram illustrating the interactions between a SPEAKLIKE client, a control server and various databases maintained by the SPEAKLIKE platform, in accordance with the system of FIG. 1.

Turning now to FIG. 3, herein is depicted an exemplary exchange between a client and the Control Server. The user, on initial contact with the SPEAKLIKE platform, may download and installs an operating system (OS)-specific SPEAKLIKE application (i.e., MACINTOSH, MICROSOFT and LINUX versions). The download may, in the case where the client operates a PC or the like, be configured for the user's specific web browser (i.e. INTERNET EXPLORER, MAZLLA FIREFOX, or the like).

FIG. 3 also depicts the various database and additional components that may be accessed by the Control Server 110 of the SPEAKLIKE platform to accomplish various of the functions described herein. A user runs a SPEAKLIKE client application on a PC, for example. The client application may handle all administrative tasks (e.g., login, payment, profile update, usage statistics, historical information and the like). The user's profile may be stored in a profile database 114, which may contain groundtruth data for the individual, such as recordings of known texts that can be used for training engines and speech recognition. The results of training an engine on an individual's voice are also stored in the profile database 114. Transcripts of an individuals conversations may be stored in transcription database 115. Charges to the user for translation services may be stored in an accounting database 116. Other databases, or equivalents thereof, may likewise be employed.

Figure 4:
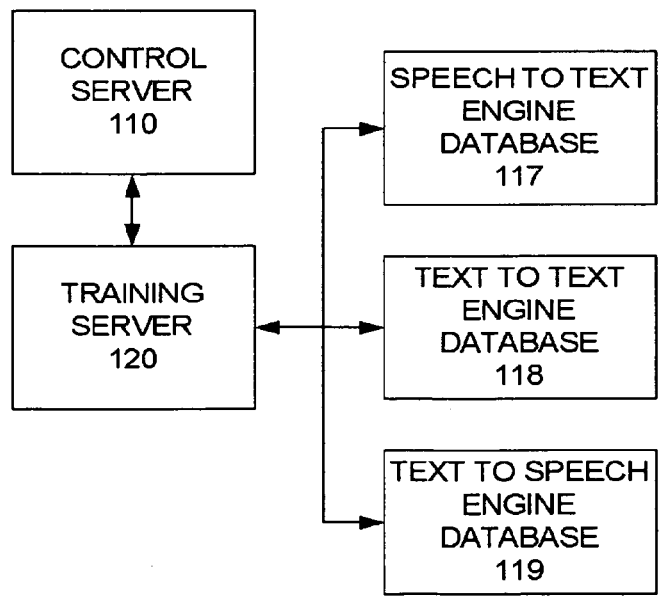
FIG. 4 is a block diagram illustrating a training server that may be used in conjunction with the system of FIG. 1.

Turning now to FIG. 4, therein is depicted an exemplary training server 120 operating in conjunction with the control server 110, as well as various translation processes depicted. The training server 120 is programmed to assist a user with voice training the SPEAKLIKE platform to the user's voice characteristics and the like, and may store the same in appropriate speech-to text engine database 117, text to text engine database 118 and text to speech engine database 119 for use by the SPEAKLIKE platform in accomplishing future translations.

SPEAKLIKE continuously and/or periodically tracks the addition of new translation engines to its collections. When a new engine is added, SPEAKLIKE uses the user's stored voice profiles to train the new components automatically to said user's voice characteristics, so the update is invisible to the user, and need only be performed once. This is critical to having rapid release cycles on individual engines, and a significant advantage over certain existing proprietary translation platforms.

Figure 5:
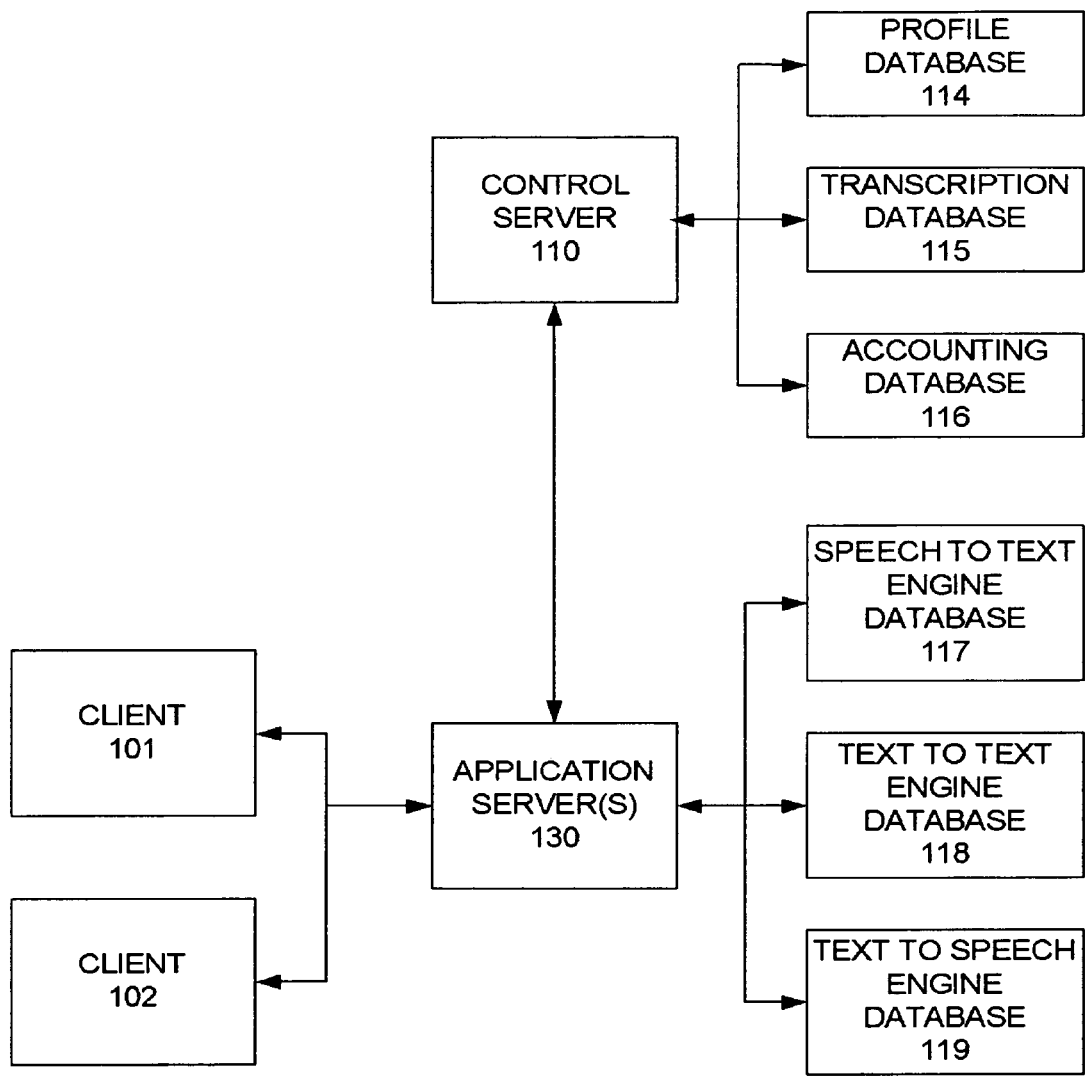
FIG. 5 is a block diagram illustrating application servers that may be used in conjunction with the system of FIG. 1.

Turning finally to FIG. 5, a real-time speech translation application is depicted therein, where one or more application servers 130 are provided for providing translation, voice capture and other services on client's running thin-client hardware with limited processing capabilities, such as a standard hard-wired telephone. Application servers 130 are provided on a one-to-one or one-to-many basis to handle SPEAKLIKE application processing on behalf of the client utilizing a thin device.

Users register their availability on a control server by logging in, select an application for which they are approved or subscribed, select a person to call, negotiate with the called party other whether the call transcript will be saved, listen and speak normally during the call, while the application server processes and translates the conversation.

A user's own speech may be compressed locally but analyzed and translated on the application server. Users receive streamed speech, unless they can run a text-to-speech (TTS) engine locally, or the like.

Optionally, the text of the conversation may appears as on-screen text to any party to a call running a device with a suitable display. The text may be provided in any one or more appropriate languages at the party's selection.

In a setup phase, SPEAKLIKE establishes both parties are available, paid up, and trained on the requisite engines for the selected application. It may perform QoS monitoring (e.g. latency tracking, and "what" button hitting). It may also initiate an application server, and hand off the conversation to the same from the control server upon call establishment.

In a communication phase, the application servers process speech, and exchange translated text as described above.

While the embodiments above have been described in the context of a telephone or VOIP telephone call, it shall be readily understood that any type of communication may be accommodated. For example, an instant messaging conversation may be established in place of a phone call. Text may be translated in real-time before transmission to parties, wherein the text is automatically translated to the language of the receiving party. In such embodiments, text to speech and speech to text components may or may not be optionally employed at the selection of the parties to the conversation.

Other forms of communication are likewise accommodated, besides speech or writing. For example, one or more parties to a call may utilize sign language. The client device may include a visual acquisition device to capture the motions of the party using sign language, and such motion may be recognized using various known computer-motion recognition algorithms. Signing may be converted therefrom to text in the manner described above, with the rest of the SPEAKLIKE functionality utilized as described in the foregoing. It should be recognized that American Sign Language may be converted to any spoken, written or other international sign language. For example, a display of a receiving device may show a generated image of a human signing in the appropriate language to any party to the call.

The SPEAKLIKE platform may also incorporate human translation services to assist in real-time or near-real-time live translation or to provide further accuracy and enhancements to the automated translation processing. For example, a translator may be included in a call between a two parties. As the translator enters translated text, the translation may be stored, for example by the text translation engines 112, for use in future translations. Alternatively, or in addition thereto, human translators may be used to double-check and correct automated text translations prior to their being used in the communication. Such corrections may likewise be stored for future use. In these manners, the SPEAKLIKE platform becomes more accurate over time and with each use to improve the accuracy of the translations provided.

Where existing software platforms and protocols have been referenced hereinabove, it should be understood that the underlying inherent functionalities thereof may be used to enable various features of the present disclosure. Other similar software and functionalities may likewise be employed. Although the best methodologies have been particularly described in the foregoing, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. An apparatus for translating speech from a first language used by a calling party to a second language used by a called party during a voice-over-Internet protocol (VOIP) call, comprising:
   a processor; and
   a memory in communication with the processor, the memory storing processing instructions executed by the processor, the processing instructions including:
      a speech-to-text module for receiving speech in the first language from the calling party and converting the speech to corresponding text in the first language, wherein the speech in the first language is received as output data from a proprietary application of the calling party;
      a socket for converting the output data from the proprietary application to an open source format;
      a text translation module for translating the corresponding text in the first language to text in the second language;
      a text-to-speech module for converting the text in the second language to corresponding speech in the second language, and for playing the corresponding speech in the second language to the called party; and
      an accounting module for determining a charge to at least one of the called party and the calling party for translating speech during the call.

2. The apparatus of claim 1, wherein the text translation module includes processing instructions to display the corresponding text in the first language to the calling party.

3. The apparatus of claim 1, wherein the text module includes processing instructions to display the text in the second language to the called party.

4. The apparatus of claim 1, wherein the memory further comprises:
   a speech-to-text module for receiving speech in the second language from the called party and converting the speech to corresponding text in the second language;
   a text translation module for translating the corresponding text in the second language to text in the first language; and
   a text-to-speech module for converting the text in the first language to corresponding speech in the first language, and for playing the corresponding speech in the first language to the calling party.

5. The apparatus of claim 4, wherein the text translation module for translating the corresponding text in the second language further includes processing instructions to display the corresponding text in the second language to the called party.

6. The apparatus of claim 4, wherein the text translation module for translating the corresponding text in the second language further includes processing instructions to display the text in the first language to the calling party.

7. The apparatus of claim 4, wherein the speech in the second language is received as output data from a proprietary application of the called party, the memory further including a socket for converting the output data from the proprietary application of the called party to an open source format.

8. The apparatus of claim 1, the memory further comprising:
   a transcription module for providing a text transcription of at least a potion of a conversation between the calling party and the called party.

9. The apparatus of claim 8, wherein the text transcription can be provided in at least one of the first language and the second language.

10. The apparatus of claim 1, wherein human-translated text is used to improve an accuracy of the text translation module.

* * * * *